United States Patent
Nojima

(10) Patent No.: US 11,364,827 B2
(45) Date of Patent: Jun. 21, 2022

(54) VEHICLE SEAT

(71) Applicant: TACHI-S CO., LTD., Tokyo (JP)

(72) Inventor: Hiroyuki Nojima, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 17/262,033

(22) PCT Filed: May 22, 2019

(86) PCT No.: PCT/JP2019/020311
§ 371 (c)(1),
(2) Date: Jan. 21, 2021

(87) PCT Pub. No.: WO2020/021834
PCT Pub. Date: Jan. 30, 2020

(65) Prior Publication Data
US 2021/0253004 A1    Aug. 19, 2021

(30) Foreign Application Priority Data
Jul. 24, 2018    (JP) .............................. JP2018-138830

(51) Int. Cl.
*B60N 2/58* (2006.01)
*B60N 2/90* (2018.01)
*B68G 7/05* (2006.01)

(52) U.S. Cl.
CPC ............. *B60N 2/5825* (2013.01); *B60N 2/90* (2018.02); *B68G 7/05* (2013.01)

(58) Field of Classification Search
CPC ........... B60N 2/5825; B60N 2/90; B68G 7/05
USPC ...................................................... 297/218.1
See application file for complete search history.

(56) References Cited

U.S. PATENT DOCUMENTS

| | | | | | |
|---|---|---|---|---|---|
| 4,789,201 A | * | 12/1988 | Selbert | ................. | B60N 2/5825 |
| | | | | | 297/218.1 |
| 4,861,104 A | * | 8/1989 | Malak | .................. | B60N 2/5825 |
| | | | | | 297/218.3 |
| 2009/0295215 A1 | * | 12/2009 | Galbreath | ............ | B60N 2/2887 |
| | | | | | 297/452.6 |

FOREIGN PATENT DOCUMENTS

| | | | |
|---|---|---|---|
| JP | 2000189271 | * | 7/2000 |
| JP | 2003009078 | * | 1/2003 |
| JP | 2005-261568 A | | 9/2005 |
| JP | 2009101821 | * | 5/2009 |
| JP | 2010-240249 A | | 10/2010 |
| JP | 2014094686 | * | 5/2014 |
| JP | 2017-012227 A | | 1/2017 |

OTHER PUBLICATIONS

Aug. 6. 2019, International Search Report issued for related PCT Application No. PCT/JP2019/020311.

(Continued)

*Primary Examiner* — Mark R Wendell
(74) *Attorney, Agent, or Firm* — Paratus Law Group, PLLC

(57) ABSTRACT

A vehicle seat is provided with a frame, a cushion pad which is disposed on the frame, a trim cover which covers the cushion pad, and a fastener provided to the surface of the cushion pad, which is installed on the frame. The fastener has a frame affixation section which is affixed to the frame, and a cover engagement section with which an end of the trim cover is engaged, and the fastener is joined to the cushion pad.

6 Claims, 7 Drawing Sheets

(56) References Cited

OTHER PUBLICATIONS

Aug. 6, 2019, International Search Opinion issued for related PCT Application No. PCT/JP2019/020311.

* cited by examiner

VEHICLE SEAT

CROSS REFERENCE TO PRIOR APPLICATION

This application is a National Stage Patent Application of PCT International Patent Application No. PCT/JP2019/020311 (filed on May 22, 2019) under 35 U.S.C. § 371, which claims priority to Japanese Patent Application No. 2018-138830 (filed on Jul. 24, 2018), which are all hereby incorporated by reference in their entirety.

TECHNICAL FIELD

The present invention relates to a vehicle seat.

BACKGROUND ART

FIG. 6 illustrates a vehicle seat described in Patent Literature 1.

A seat cushion of an automobile seat 111 includes a seat frame 115, a cushion pad 116 arranged on the seat frame 115, and a trim cover 117 covering the seat frame 115 and the cushion pad 116.

The seat frame 115 has a pair of left and right side frames 113 extending in a front-rear direction of the seat and a front frame 114 connecting the pair of side frames 113 to each other. At the edge of the trim cover 117 which overlaps the side frame 113, a trim cover fixture 118 having a plurality of hook portions is provided. The trim cover 117 is fixed to the seat frame 115 by hooking the hook portion of the trim cover fixture 118 to the side frame 113. The cushion pad 116 is held on the seat frame 115 by being interposed between the seat frame 115 and the trim cover 117.

Patent Literature 1: JP 2017-12227 A

SUMMARY OF INVENTION

When the automobile seat 111 described in Patent Literature 1 is assembled, the cushion pad 116 is first arranged on the seat frame 115. Next, the trim cover 117 is arranged so as to cover the cushion pad 116 and the hook portion of the trim cover 117 is hooked on the side frame 113. In this way, multiple tasks are required to assemble the automobile seat, so improvement in work efficiency is desired. Further, the cushion pad 116 is only interposed between the seat frame 115 and the trim cover 117, and thus there is a possibility that the cushion pad 116 may be misaligned with respect to the seat frame 115 and the trim cover 117.

An object of the invention is to provide a vehicle seat which is excellent in assembly work efficiency and can suppress mutual misalignment between a frame, a cushion pad, and a trim cover.

According to an aspect of the invention there is provided a vehicle seat including a frame, a cushion pad installed in the frame, a trim cover covering the cushion pad, and a fastener provided on an installation surface of the cushion pad for the frame, where the fastener has a frame fixing portion fixed to the frame and a cover locking portion for locking a terminal portion of the trim cover and is joined to the cushion pad.

According to the invention, it is possible to provide a vehicle seat which is excellent in assembly work efficiency and can suppress mutual misalignment between a frame, a cushion pad, and a trim cover.

DESCRIPTION OF EMBODIMENTS

Figure 1:
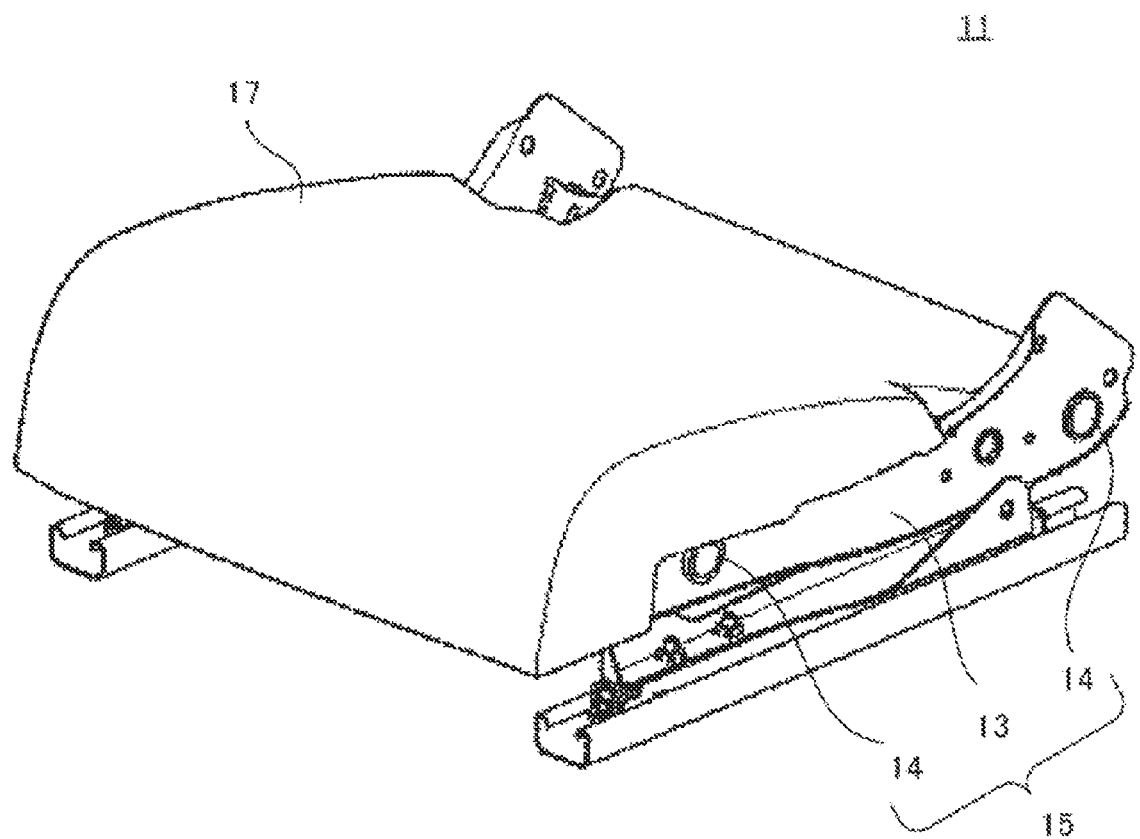
FIG. 1 is a perspective view of an example of a vehicle seat for explaining an embodiment of the invention.
Figure 2:
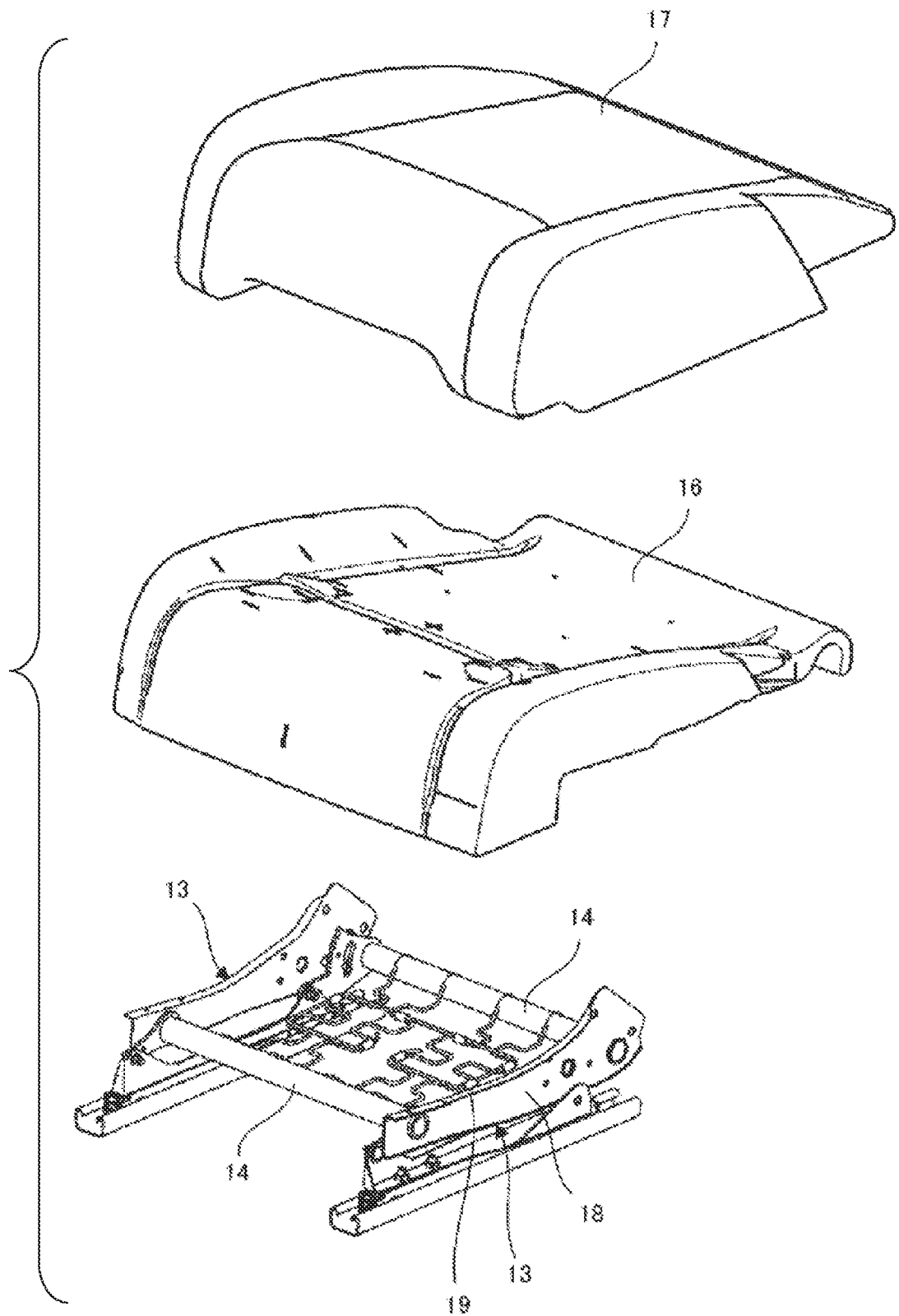
FIG. 2 is an exploded perspective view of the vehicle seat of FIG. 1.

FIGS. 1 and 2 illustrate an example of a vehicle seat for explaining an embodiment of the invention.

A seat cushion of a vehicle seat 11 illustrated in FIGS. 1 and 2 includes a frame 15, a cushion pad 16 installed on the frame 15, and a trim cover 17 covering the cushion pad 16.

The frame 15 has a pair of left and right side frames 13 extending in a front-rear direction of the vehicle seat 11 and a pair of connecting frames 14 connecting front end portions and rear end portions of the side frames 13. The cushion pad 16 is made of a foam material such as urethane foam. A plurality of skin materials are joined to the trim cover 17, and for example, leather (natural leather, synthetic leather), cloth (knit, woven cloth, non-woven fabric), or the like is used as the skin material. The skin material may have a single-layer structure of leather or cloth or may have a multi-layer structure in which leather or cloth is used as the outer material and wading (for example, a resin foam such as elastically deformable flexible polyurethane foam) is laminated on the leather or cloth.

On the back surface of the cushion pad 16, that is, an installation surface with respect to the frame 15, a fastener for fixing to the frame 15 and locking the trim cover 17 is provided. The trim cover 17 is locked to the fastener of the cushion pad 16 in a state of covering the cushion pad 16 and is assembled to the cushion pad 16. Then, the cushion pad 16 is fixed to the frame 15 by the fastener.

Figure 3:
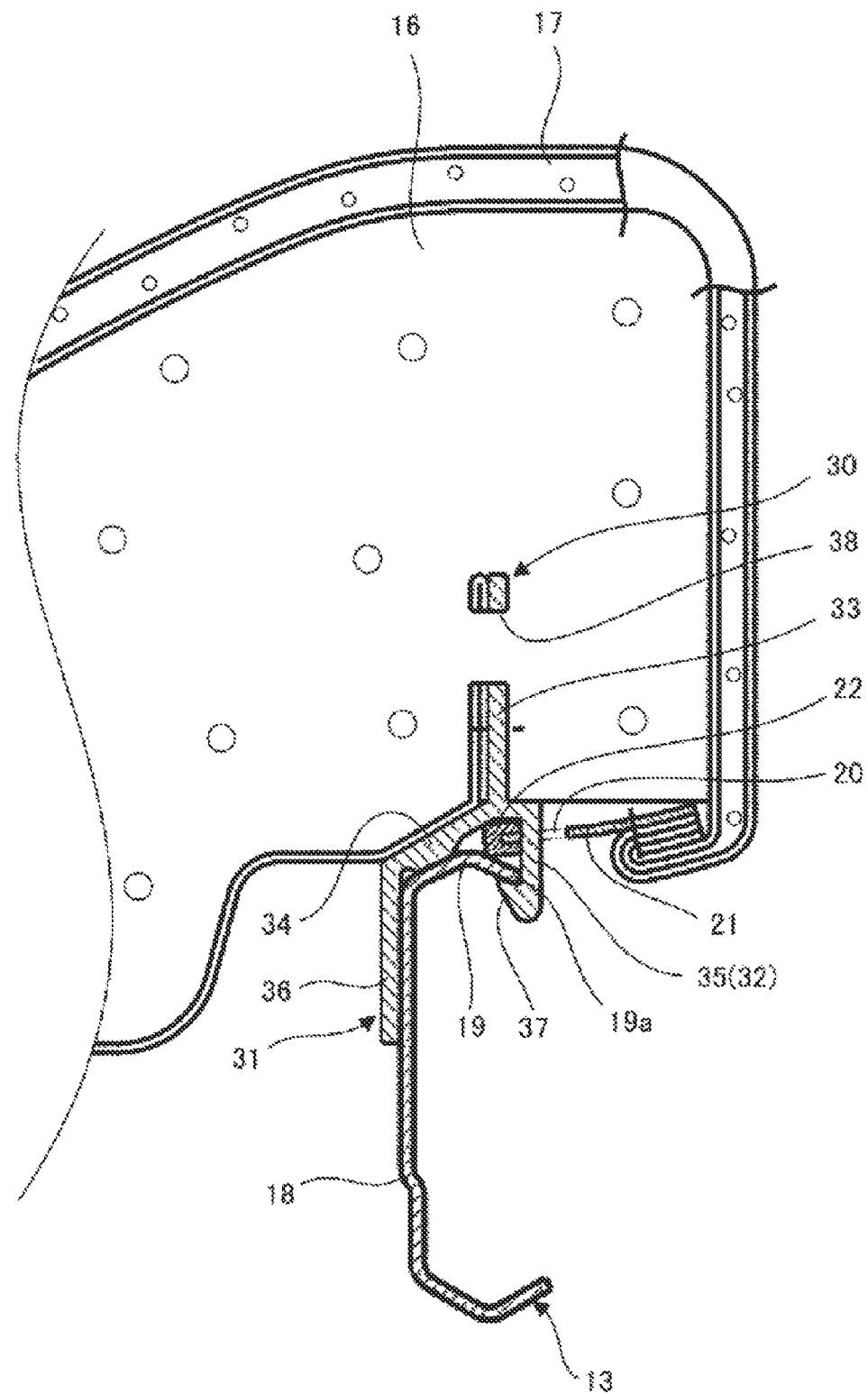
FIG. 3 is a cross-sectional view illustrating a fixing portion between a cushion pad and a frame of the vehicle seat of FIG. 1.
Figure 4:
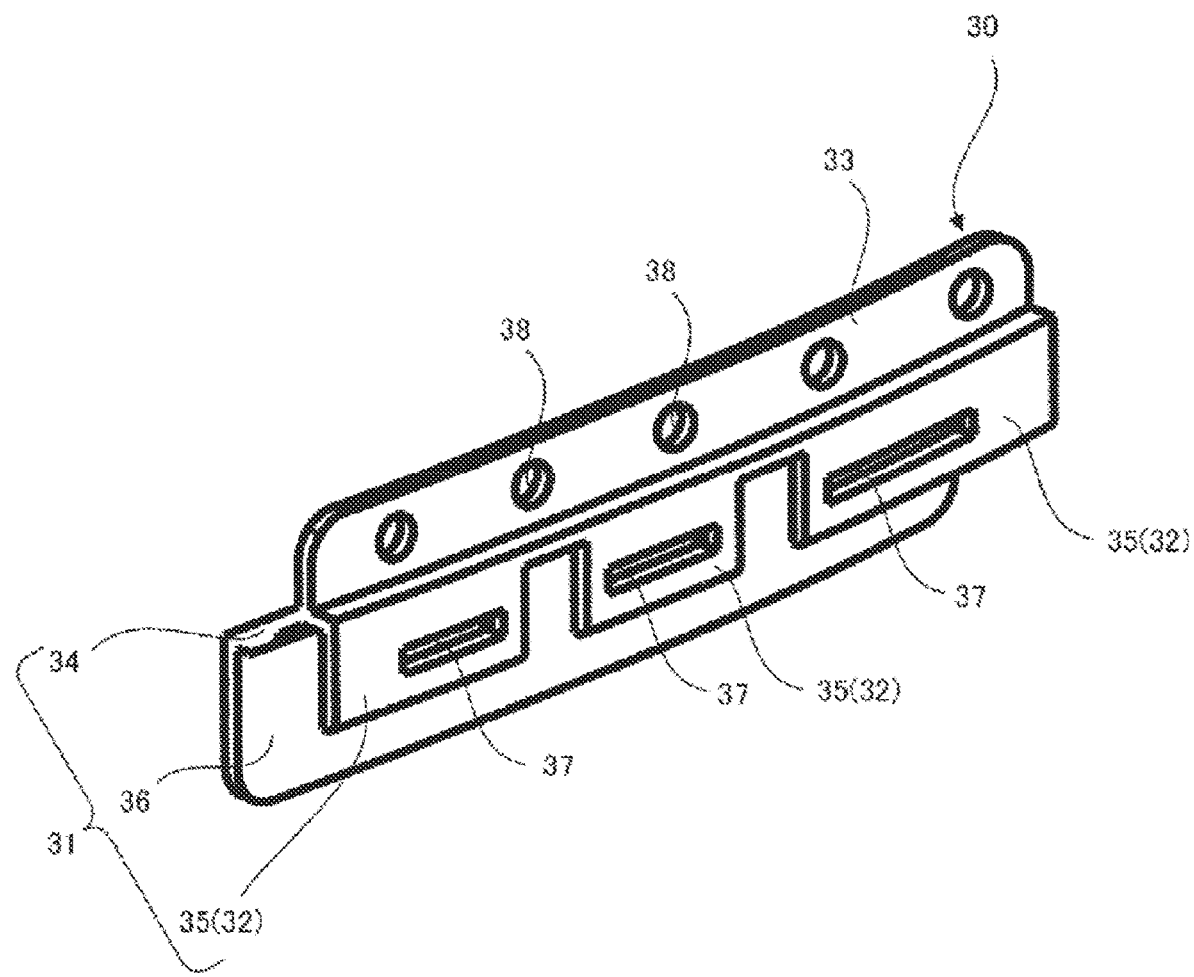
FIG. 4 is a perspective view of a fastener used for the fixing portion of FIG. 3.

FIG. 3 illustrates a fixing portion between the frame 15 and the cushion pad 16 and FIG. 4 illustrates the fastener used for the fixing portion of FIG. 3.

The fixing portion between the frame 15 and the cushion pad 16 illustrated in FIG. 3 is a fixing portion in the side frame 13. Although only the fixing portion of one side frame 13 is illustrated in FIG. 3, the fixing portion of the other side frame 13 is similarly configured.

The side frame 13 is made of a metal plate and has a frame body 18 extending in the front-rear direction of the seat and a flange 19. The frame body 18 is arranged in a state of being raised substantially perpendicular to an installation surface 16a of the cushion pad 16. The flange 19 is formed by bending an upper (installation surface 16a side) edge of the frame body 18 toward the outside of the seat and arranged along the installation surface 16a. An edge portion 19a of the flange 19 facing the outside of the seat is inclined downward such that the edge portion 19a gets away from the installation surface 16a as going to a tip of the edge portion 19a.

A fastener 30 is provided in an area overlapping the side frame 13 on the installation surface 16a of the cushion pad 16. The fastener 30 has a frame fixing portion 31 fixed to the side frame 13, a cover locking portion 32 for locking the trim cover 17, and a pad joining portion 33 joined to the cushion pad 16. The fastener 30 is made of a resin material and the frame fixing portion 31, the cover locking portion 32, and the pad joining portion 33 are formed in one piece.

The frame fixing portion 31 includes a base portion 34 arranged along the installation surface 16*a* of the cushion pad 16, a locking piece 35 protruding from the base portion 34 toward the frame, and a support piece 36 protruding from the base portion 34 toward the frame. A plurality of locking pieces 35 are provided at intervals in the front-rear direction of the seat and three are provided in the example illustrated in FIG. 4. The support piece 36 extends in the front-rear direction of the seat with a space between the three locking pieces 35 and protrudes further toward the frame side than the locking piece 35. At the tip of each locking piece 35, a claw 37 protruding toward the support piece 36 is formed. The side frame 13 is inserted between the locking piece 35 and the support piece 36, and the claw 37 of the locking piece 35 is locked to the edge portion 19*a* of the flange 19, and thus the frame fixing portion 31 is fixed to the side frame 13.

In the example illustrated in FIGS. 3 and 4, the cover locking portion 32 is composed of a plurality of locking pieces 35 of the frame fixing portion 31. A plurality of locking holes 20 are formed in the terminal portion of the trim cover 17 and the locking pieces 35 is inserted into the respective locking holes 20. As a result, the terminal portion of the trim cover 17 is locked by the plurality of locking pieces 35 and the trim cover 17 is assembled to the cushion pad 16. The terminal portion of the trim cover 17 in which the locking hole 20 is provided is formed using a suspender (suspension cloth) 21 sewn on the skin material and the suspender 21 is made of a material having a higher tear strength than that of the skin material. Further, a reinforcing material 22 such as tape is joined to the edge of the suspender 21 located closer to the terminal than the locking hole 20.

The pad joining portion 33 is provided so as to protrude from the base portion 34 of the frame fixing portion 31 toward the cushion pad 16. A plurality of through holes 38 are formed in the pad joining portion 33 and the pad joining portion 33 is embedded in the cushion pad 16 in a state where the material of the cushion pad 16 is filled in the through holes 38. Since the material of the cushion pad 16 is filled in the through holes 38, the pad joining portion 33 is firmly joined to the cushion pad 16. Such joining can be performed by integral foam molding in which the cushion pad 16 is foam-molded integrally with the fastener 30. However, the method of joining the pad joining portion 33 to the cushion pad 16 is not limited to integral foam molding, and for example, the pad joining portion 33 may be bonded to the cushion pad 16.

Figure 5A:
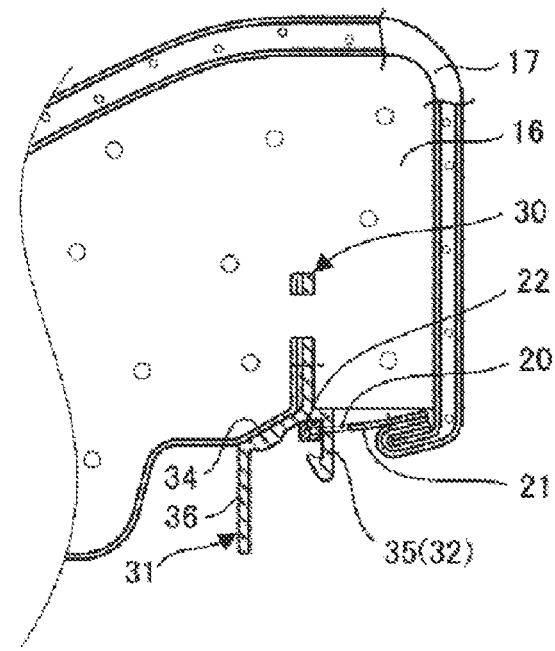
FIG. 5A is a cross-sectional view for sequentially explaining a method of assembling the vehicle seat of FIG. 1.
Figure 5B:
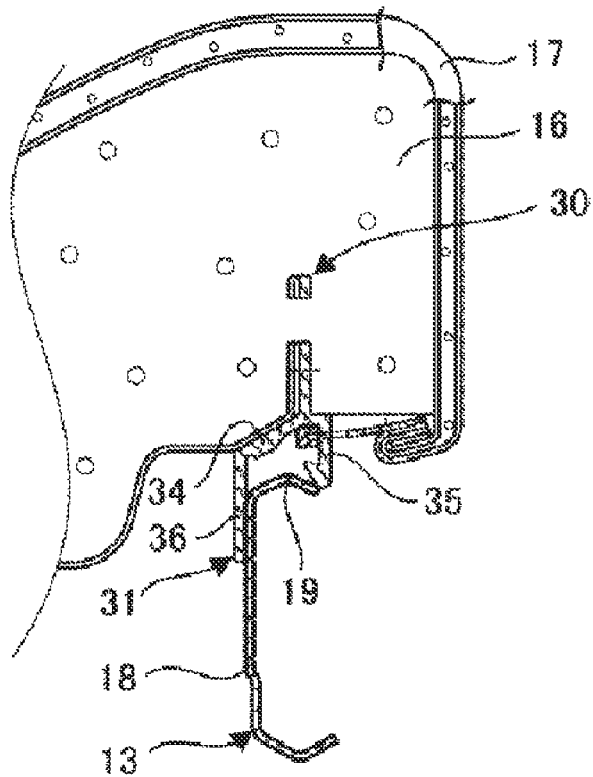
FIG. 5B is a cross-sectional view for sequentially explaining a method of assembling the vehicle seat of FIG. 1.
Figure 5C:
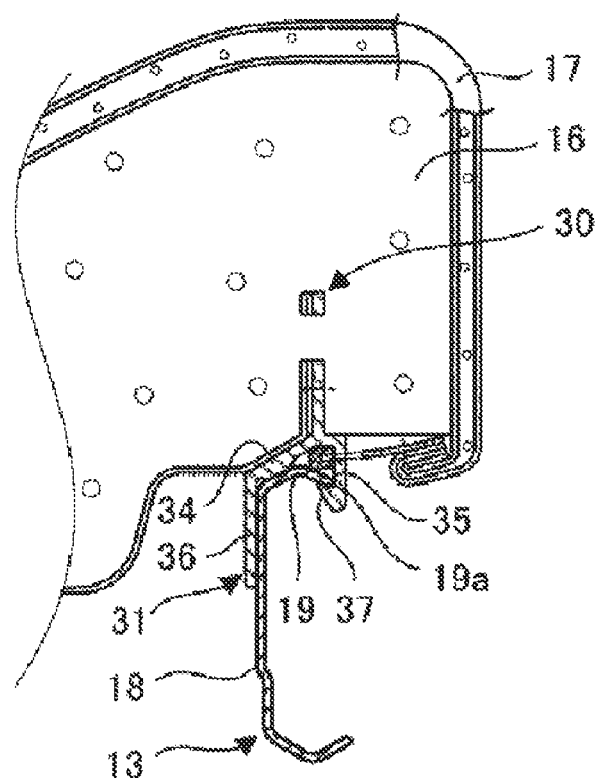
FIG. 5C is a cross-sectional view for sequentially explaining a method of assembling the vehicle seat of FIG. 1.
Figure 6:
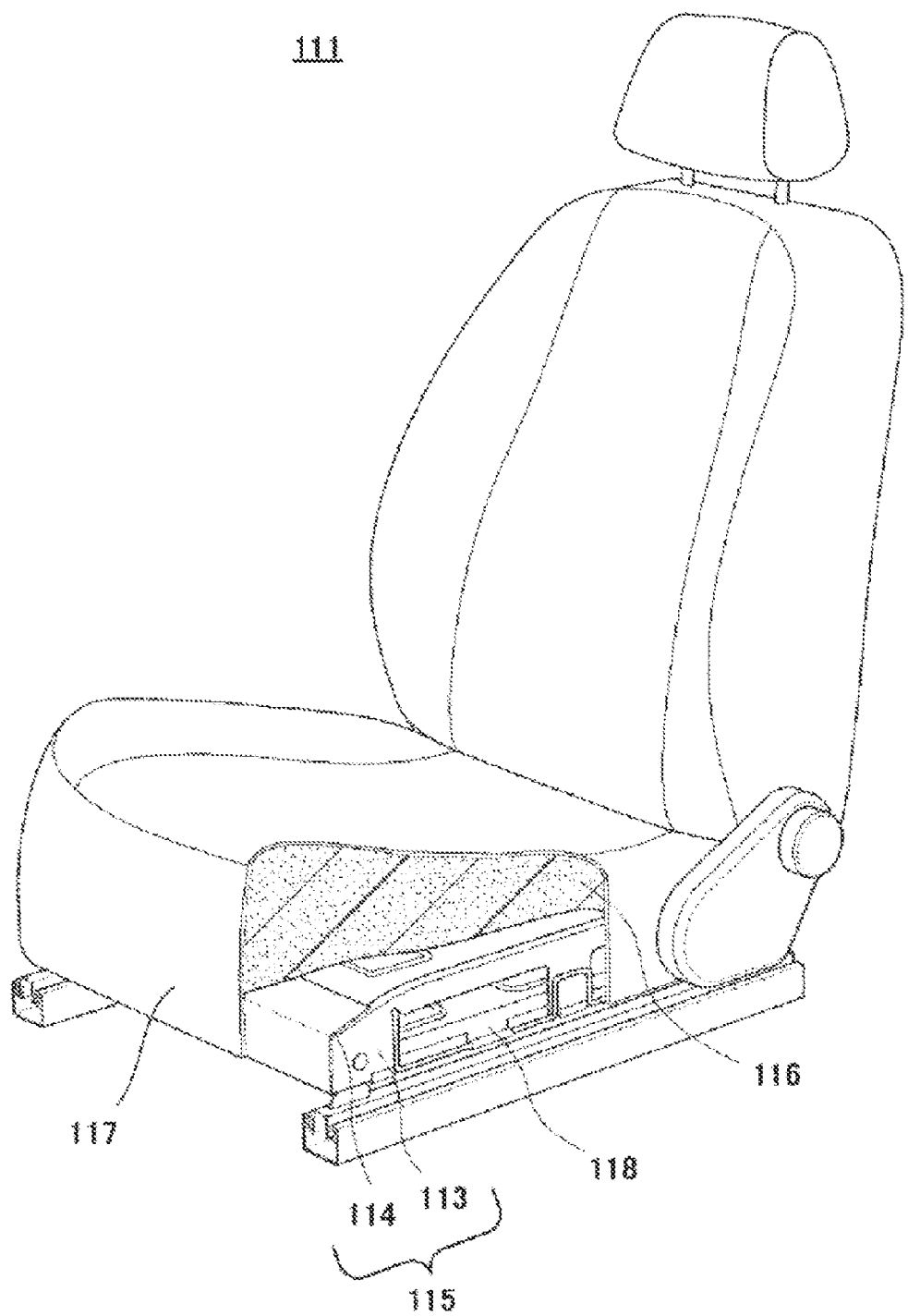
FIG. 6 is a perspective view of a vehicle seat of the related art.

FIGS. 5A to 5C illustrate a method of assembling the vehicle seat according to the embodiment.

As illustrated in FIG. 5A, the trim cover 17 covers the cushion pad 16 and the locking piece 35 (cover locking portion 32) of the fastener 30 is inserted into the locking hole 20 formed in the terminal portion of the trim cover 17, and thus the trim cover 17 is assembled to the cushion pad 16 in advance.

Next, as illustrated in FIG. 5B, the cushion pad 16 is pressed against the frame 15 and the side frame 13 is inserted between the plurality of locking pieces 35 and the support piece 36 of the fastener 30. The side frame 13 is guided between the locking piece 35 and the support piece 36 by sliding the frame body 18 of the side frame 13 with the support piece 36 protruding further toward the frame side than the locking piece 35. As a result, the cushion pad 16 can be positioned with respect to the side frame 13 and the assembly workability can be improved.

As illustrated in FIG. 5C, when the side frame 13 is completely inserted between the locking piece 35 and the support piece 36 of the frame fixing portion 31, the claw 37 of the locking piece 35 is locked to the edge portion 19*a* of the flange 19, and thus the frame fixing portion 31 is fixed to the side frame 13.

In the vehicle seat 11 configured as described above, the trim cover 17 and the cushion pad 16 can be assembled to the frame 15 at the same time in a state where the trim cover 17 is assembled to the cushion pad 16 in advance. Therefore, the work efficiency of assembly is excellent.

Also, since the cushion pad 16 is fixed to the frame 15 by the fastener 30 and the trim cover 17 is locked to the cushion pad 16 by the fastener 30, it is possible to suppress the mutual misalignment between the frame 15 and the cushion pad 16 and the trim cover 17. Then, since the fastener 30 which locks the trim cover 17 to the cushion pad 16 is fixed to the frame 15, even when the cushion pad 16 is deformed, the fastener 30 is not displaced, and thus it is possible to prevent the trim cover 17 from being unlocked.

Further, the frame fixing portion 31 of the fastener 30 pinches the side frame 13 between the locking piece 35 and the support piece 36. Therefore, regardless of the deformation of the cushion pad 16, a state where the locking piece 35 is locked by the flange 19 of the side frame 13 can be reliably maintained. As a result, the fixing strength of the cushion pad 16 with respect to frame 15 can be increased.

Further, the terminal portion of the trim cover 17 is locked by inserting the locking piece 35 (cover locking portion 32) into the locking hole 20 and is interposed between the base portion 34 of the frame fixing portion 31 and the flange 19 of the side frame 13 which locks the locking piece 35. As a result, it is possible to reliably prevent the locking piece 35 from coming out of the locking hole 20 and unlocking the terminal portion of the trim cover 17.

Also, the edge portion 19*a* of the flange 19 is inclined toward the tip thereof in a direction getting away from the base portion 34 of the frame fixing portion 31 and a space is formed between the base portion 34 and the edge portion 19*a*. By accommodating the terminal portion (suspender 21 and reinforcing material 22) of the trim cover 17 interposed between the base portion 34 and the flange 19 in the space between the base portion 34 and the edge portion 19*a*, the base portion 34 and the flange 19 can be brought into close contact with each other. As a result, the stability of the cushion pad 16 can be enhanced.

So far, the invention has been described by taking the seat cushion of the vehicle seat 11 as an example, but the seat back can be similarly configured. Further, although the invention has been described by taking vehicle seat 11 installed in a vehicle such as an automobile as an example, the invention is also applicable to vehicle seats of vehicles other than automobiles such as ships and aircraft.

As described above, the vehicle seat disclosed in this specification includes a frame, a cushion pad installed in the frame, a trim cover covering the cushion pad, and a fastener provided on an installation surface of the cushion pad for the frame, where the fastener has a frame fixing portion fixed to the frame and a cover locking portion for locking a terminal portion of the trim cover and is joined to the cushion pad.

Further, in the vehicle seat disclosed in this specification, the fastener may have a pad joining portion in which at least one through hole is provided and the pad joining portion may be embedded in the cushion pad in a state where a material of the cushion pad is filled in the through hole.

Also, in the vehicle seat disclosed in this specification, the frame fixing portion may include a base portion which is placed along the installation surface of the cushion pad, a locking piece which protrudes from the base portion toward the frame and is locked to the frame, and a support piece which protrudes from the base portion toward the frame at a distance from the locking piece and pinches the frame with the locking piece.

In the vehicle seat disclosed in this specification, the support piece may further protrude toward the frame than the locking piece.

In the vehicle seat disclosed in this specification, the cover locking portion may be composed of the locking piece and locks the terminal portion by being inserted into a locking hole provided in the terminal portion of the trim cover and the terminal portion of the trim cover may be interposed between the base portion of the frame fixing portion and the frame.

In the vehicle seat disclosed in this specification, the frame may be made of a plate material and may have a frame body adjacent to the support piece of the frame fixing portion and a flange extending from the frame body toward the locking piece of the frame fixing portion and the locking piece of the frame fixing portion is locked to an edge portion of the flange, and further the edge portion of the flange may be inclined toward a tip thereof in a direction getting away from the base portion of the frame fixing portion.

The invention can provide a vehicle seat for an automobile, a ship, an aircraft, or the like, which is excellent in assembly work efficiency and can suppress mutual misalignment between a frame, a cushion pad, and a trim cover.

The embodiments of the invention have been described in detail above, but this is merely an example and the invention can be carried out in a mode in which various modifications are made without departing from the spirit thereof.

REFERENCE SIGNS LIST

11: vehicle seat
13: side frame
14: connecting frame
15: frame
16: cushion pad
16a: installation surface of cushion pad
17: trim cover
18: frame body
19: flange
19a: edge portion of flange
20: locking hole
21: suspender
22: reinforcing material
30: fastener
31: frame fixing portion
32: cover locking portion
33: pad joining portion
34: base portion of frame fixing portion
35: locking piece of frame fixing portion
36: support piece of frame fixing portion
37: claw
38: through hole of pad joining portion

The invention claimed is:

1. A vehicle seat, comprising:
a frame;
a cushion pad installed in the frame;
a trim cover covering the cushion pad; and
a fastener provided on an installation surface of the cushion pad for the frame, wherein
the fastener has a frame fixing portion fixed to the frame and a cover locking portion for locking a terminal portion of the trim cover and is joined to the cushion pad, and
the cushion pad is made of urethane foam.

2. The vehicle seat according to claim 1, wherein
the fastener has a pad joining portion in which at least one through hole is provided, and
the pad joining portion is embedded in the cushion pad in a state where a material of the cushion pad is filled in the through hole.

3. The vehicle seat according to claim 1, wherein
the frame fixing portion includes,
a base portion which is placed along the installation surface of the cushion pad,
a locking piece which protrudes from the base portion toward the frame and is locked to the frame, and
a support piece which protrudes from the base portion toward the frame at a distance from the locking piece and pinches the frame with the locking piece.

4. The vehicle seat according to claim 3, wherein
the support piece further protrudes toward the frame than the locking piece.

5. The vehicle seat according to claim 3, wherein
the cover locking portion is composed of the locking piece and locks the terminal portion by being inserted into a locking hole provided in the terminal portion of the trim cover, and
the terminal portion of the trim cover is interposed between the base portion of the frame fixing portion and the frame.

6. The vehicle seat according to claim 5, wherein
the frame is made of a plate material and has a frame body adjacent to the support piece of the frame fixing portion and a flange extending from the frame body toward the locking piece of the frame fixing portion,
the locking piece of the frame fixing portion is locked to an edge portion of the flange, and
the edge portion of the flange is inclined toward a tip thereof in a direction getting away from the base portion of the frame fixing portion.

\* \* \* \* \*